United States Patent [19]

Meguro

[11] Patent Number: 4,947,276
[45] Date of Patent: Aug. 7, 1990

[54] MAGNETIC TAPE CASSETTE WITH REMAINING TAPE INDICATOR

[75] Inventor: Hiroshi Meguro, Miyagi, Japan

[73] Assignee: Sony Corporation, Tokyo, Japan

[21] Appl. No.: 773,868

[22] Filed: Sep. 9, 1985

[30] Foreign Application Priority Data

Sep. 19, 1984 [JP] Japan .................... 59-142516[U]

[51] Int. Cl.⁵ .......................................... G11B 23/087
[52] U.S. Cl. .................................................. 360/132
[58] Field of Search ............... 360/132, 137; 242/195, 242/199, 200

[56] References Cited

U.S. PATENT DOCUMENTS

| | | | |
|---|---|---|---|
| 3,622,102 | 11/1971 | Fox | 242/199 |
| 3,705,699 | 12/1972 | Siller | 242/199 |
| 3,752,113 | 8/1973 | Blechman | 360/132 X |
| 4,032,987 | 6/1977 | Singer et al. | 360/132 |
| 4,091,426 | 5/1978 | Umeda | 360/74 |
| 4,343,024 | 8/1982 | Kawai | 360/74.6 |
| 4,345,540 | 8/1982 | Karmin | 360/137 X |
| 4,452,408 | 6/1984 | Sasaki | 360/132 X' |
| 4,485,421 | 11/1984 | Hoshino | 360/137 X |
| 4,524,926 | 6/1985 | Nemoto et al. | 360/132 X |
| 4,563,718 | 1/1986 | Shirako | 360/132 |
| 4,570,877 | 2/1986 | Oishi et al. | 360/132 X |
| 4,607,306 | 8/1986 | Shirako | 360/132 |
| 4,631,618 | 12/1986 | Ozawa . | |
| 4,644,433 | 2/1987 | Horikawa et al. | 360/132 |

FOREIGN PATENT DOCUMENTS

| | | |
|---|---|---|
| 0045085 | 2/1982 | European Pat. Off. . |
| 0144802 | 6/1985 | European Pat. Off. . |
| 2545253 | 4/1984 | France . |
| 2145999 | 4/1985 | United Kingdom . |
| 2150916 | 7/1985 | United Kingdom . |
| 2152009 | 7/1985 | United Kingdom . |

OTHER PUBLICATIONS

Information Terminals Corp. Sales Publication, Apr. 1971.

Primary Examiner—Robert S. Tupper
Attorney, Agent, or Firm—Ronald P. Kananen

[57] ABSTRACT

A single-sided magnetic tape cassette with a remaining tape length indicator comprises a transparent bearing sheet between the tape reels and a transparent window formed in a cassette casing, and an opaque bearing sheet between the tape reels and the opposite surface of the cassette casing. The color of the opaque bearing sheet is selected to provide good color contrast with respect to the magnetic tape. The opaque bearing sheet is white so as to ensure good color contrast with any dark magnetic tape. Alternatively, the color of the opaque bearing sheet may be any color which provides good color contrast for ease of observation of the remaining length of the tape.

4 Claims, 3 Drawing Sheets

MAGNETIC TAPE CASSETTE WITH REMAINING TAPE INDICATOR

BACKGROUND OF THE INVENTION

The present invention relates generally to a magnetic tape cassette containing a magnetic-tape recording medium wound onto a pair of tape reels. More specifically, the invention relates to a tape cassette which has a remaining tape indicator for showing visually how much tape is left for recording or play-back.

In known magnetic tape cassettes, the cassette casing has a transparent window which serves as a remaining tape length indicator. Users can visually recognize how much tape is left by monitoring the size of the tape roll still encircling the driven tape reel in comparison to the size of the tape roll on the driving tape reel. As is well known, in conventional audio tape cassettes and so forth, upper and lower transparent bearing sheet, are inserted between a face of the tape reels and the opposing inner peripheral surfaces of the cassette casing to allow smooth rotation of the tape reels. When such cassette casings are of the same or a similar color as the magnetic tape per se, it becomes difficult to see the remaining tape length due to low contrast between the casing and the tape.

On the other hand, colored cassette casings have become popular on the market. This makes it even more difficult to ensure adequate contrast between the casing and the tape.

SUMMARY OF THE INVENTION

Therefore, it is a principle object of the present invention to provide a remaining tape length indicator which facilitates visual recognition of the remaining tape length while allowing arbitrary selection of color for the cassette casing.

Another and more specific object of the invention is to provide a remaining tape indicator which includes means for providing a good color contrast with respect to the magnetic tape for ease of visual observation of the remaining length of the tape through a remaining tape length indicator window in the tape cassette casing.

A further object of the invention is to provide a remaining tape length indicator which ensures good color contrast between the magnetic tape and the indicator in a simple way and without requiring any extra manufacturing steps.

In order to accomplish the aforementioned and other objects, a magnetic tape with a remaining tape length indicator, according to the present invention, comprises a transparent bearing sheet disposed between tape reels and a transparent window formed in a cassette casing and an opaque bearing sheet disposed in the casing at a side of the tape reels opposite from the transparent window. The color of the opaque bearing sheet is selected so as to ensure good color contrast with the color of magnetic tape.

In the preferred embodiment, the opaque bearing sheet is white so as to ensure good color contrast with magnetic tape of any color. Alternatively, the color of the opaque bearing sheet can be arbitrarily selected as long as it provides good color contrast for ease of observation of the remaining length of the tape.

In practice, the remaining tape length indicator according to the present invention is specifically adapted for use in a single-sided magnetic tape cassette with one-way drive.

According to one aspect of the invention, a magnetic tape cassette comprises a cassette casing housing a pair of tape reels onto which magnetic tape is wound, a transparent window formed in one surface of the cassette casing so as to show the interior of the cassette casing, a transparent bearing sheet disposed within the cassette casing between the tape reels and the inner surface of the transparent window, and an opaque bearing sheet disposed between the opposite surface of the cassette casing and the tape reels, the opaque bearing sheet being so colored as to provide good color contrast with the color of the magnetic tape.

According to another aspect of the invention, a single-side magnetic tape cassette comprises a cassette casing housing a first tape reel onto which a magnetic tape is wound and which is driven in a first direction during recording and reproduction, and a second tape reel onto which the magnetic tape is wound and which is driven in a second, opposite direction during rewinding of the magnetic tape, a transparent window formed in one surface of the cassette casing so as to show the interior of the cassette casing, a transparent bearing sheet disposed between the tape reels and the transparent window, and an opaque bearing sheet disposed between surface of the cassette casing and the tape reels, the opaque bearing sheet being so colored as to provide good color contrast with the color of the magnetic tape.

According to a further aspect of the invention, a magnetic tape cassette comprises a cassette casing housing a tape reel onto which a magnetic tape is wound, a movable tape-protecting lid for selectably covering and exposing a front mouth of the casing, the tape-protecting lid having a side plate extending substantially parallel to side walls of the casing and pivoted thereon, a reel brake disposed within the casing and movable between a reel-brake state and a brake-release state, the reel brake being biased toward the reel brake state, in which it restricts rotation of the tape reels, and a remaining tape length indicator having a transparent window formed in one surface of the casssette casing so as to show the interior of the cassette casing, a transparent bearing sheet disposed between the tape reels and the transparent window, and an opaque bearing sheet disposed between the opposite surface of the cassette casing and the tape reels, the opaque bearing sheet being so colored as to provide good color contrast with the color of the magnetic tape.

According to a yet further aspect of the invention, a single-side magnetic tape cassette comprises a cassette casing housing a first tape reel onto which a magnetic tape is wound and which is driven in a first direction during recording and reproducing, and a second tape reel onto which the magnetic tape is wound and which is driven in a second, opposite direction during rewinding of the magnetic tape, the cassette casing having a front mouth allowing access to the tape, a movable tape-protecting lid for selectably covering and exposing part of the front mouth of the casing, the tape-protecting lid having a side plate o extending substantially parallel to side walls of the casing and pivoted thereon, a sliding closure member for selectively covering and exposing the remainder of the front mouth, the sliding closure member being slidable along one surface of and outside of the cassette casing, a reel brake disposed within the casing and movable between a reel-brake state and a brake-release state, the reel brake being biased toward the reel brake state, in which it restricts rotation of the tape reels, and a remaining tape length indicator having a transparent window formed in the opposite surface of the casssette casing so as to show the interior of the cassette casing, a transparent bearing sheet disposed within the cassette casing between the tape reels and the transparent window, and an opaque bearing sheet disposed between the first surface of the cassette casing and the tape reels within the cassette casing, the opaque bearing sheet being so colored as to provide good color contrast with the magnetic tape.

BRIEF DESCRIPTION OF THE DRAWINGS

The present invention will be understood from the detailed description given herebelow and from the accompanying drawings of the preferred embodiments of the invention, which, however, should not be taken to limit the invention to the specific embodiments but are for explanation and understanding only.

In the drawings.

DESCRIPTION OF THE PREFERRED EMBODIMENT

Figure 1:
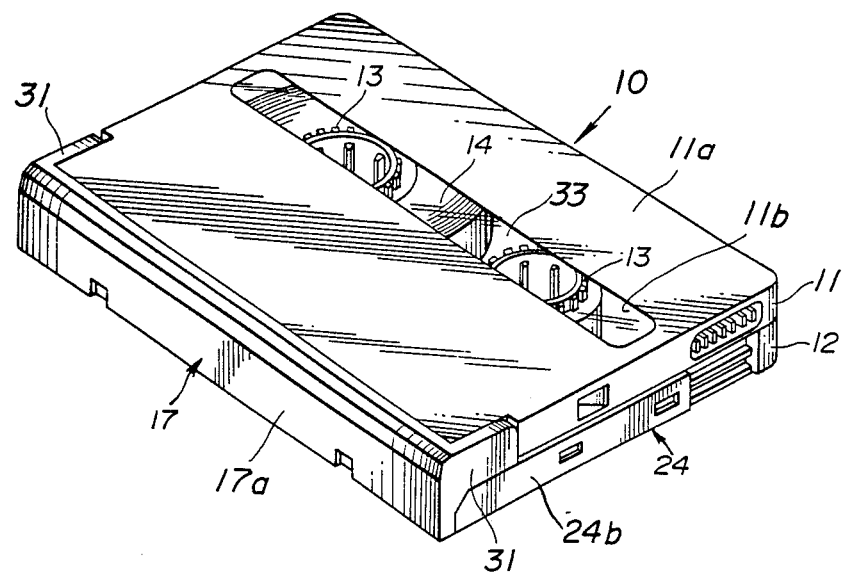
FIG. 1 a perspective view of the preferred embodiment of a magnetic tape cassette in accordance with the present invention, in which a tape-protecting lid and a sliding closure member are shown in their closed positions.
Figure 2:
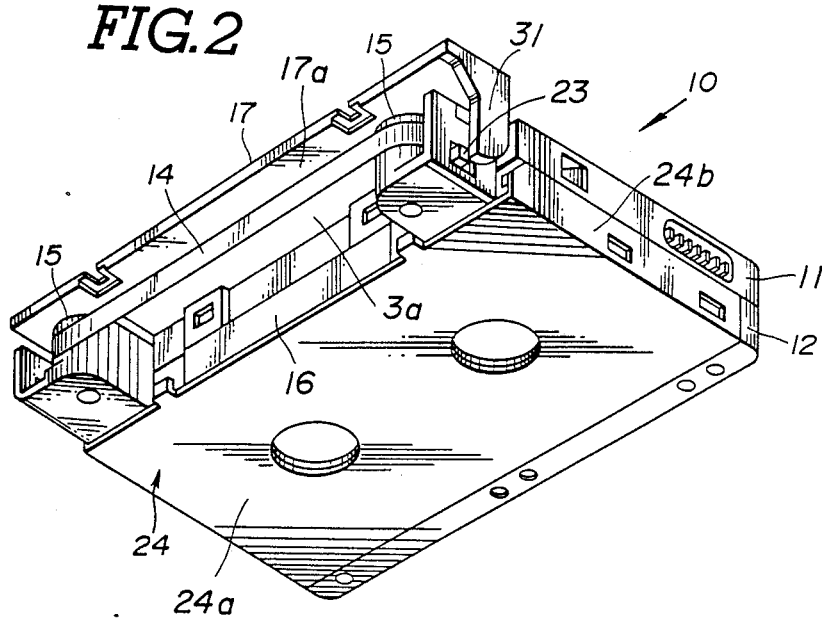
FIG. 2 is a perspective view of the magnetic tape cassette of FIG. 1, viewed from below the cassette, in which the tape-protecting lid and the sliding closure member are shown in their open positions during use of the cassette.
Figure 3:
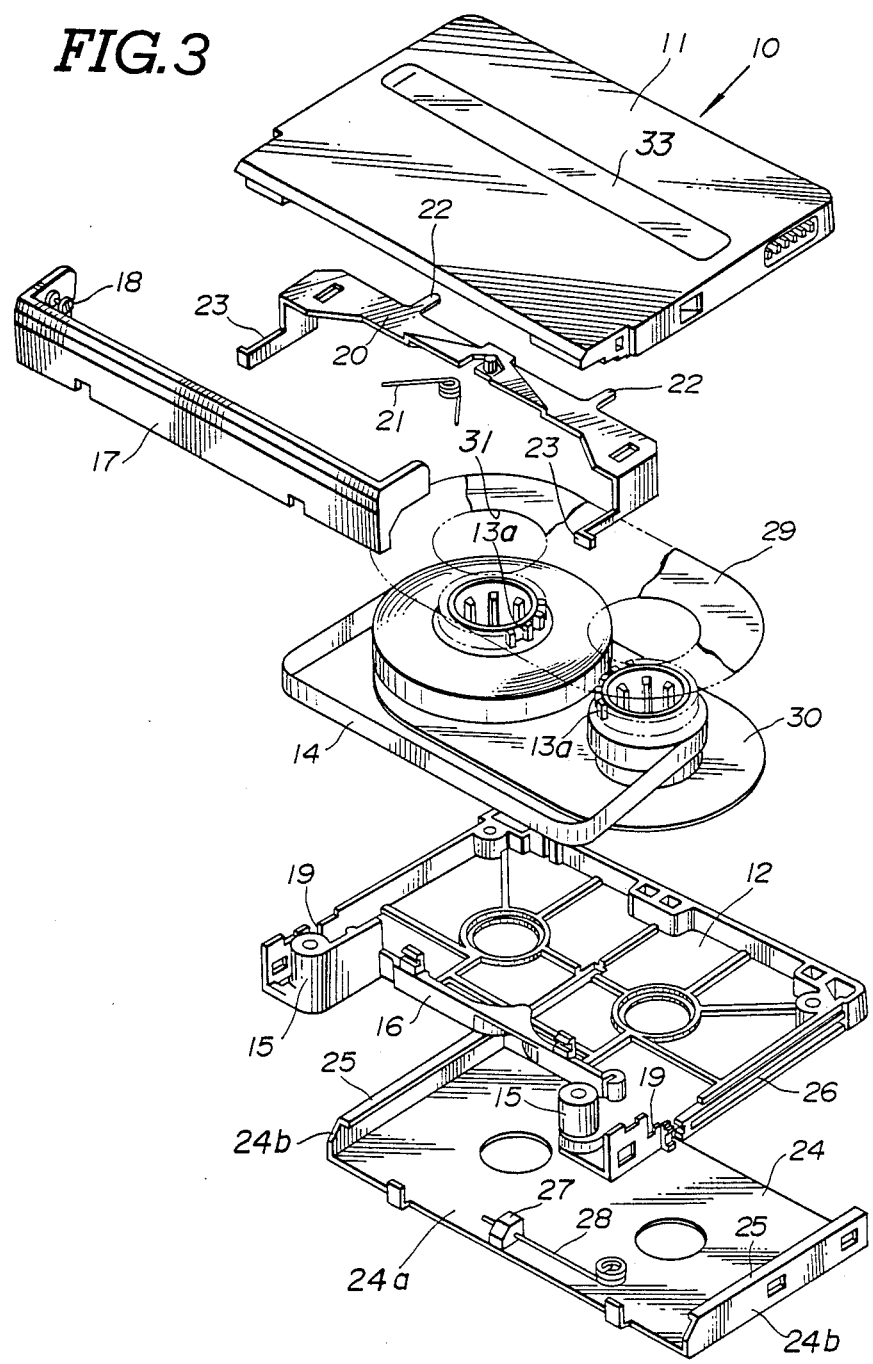
FIG. 3 is an exploded perspective view of the magnetic tape cassette of FIG. 1.

Referring now to the drawings, FIGS. 1 to 3 show a single-sided magnetic tape cassette with a one-way recording track designed for one-way drive recording and reproduction, which magnetic tape cassette exemplifies the preferred embodiment of the invention. The preferred embodiment of a magnetic tape cassette according to the present invention generally comprises a casing 10 including an upper section 11 and a lower section 12 which are connected by threaded bolts (not shown) in a per se well-known manner to form a single unit. The upper section 11 has an upper plane section 11a forming the ceiling of the cassette casing 10. A transversely elongated opening passes through the upper plane section 11a. The elongated opening passes over a pair of reel hubs 13. A transparent window plate 11b fits into the elongated opening and is thereby built into the upper surface of the upper section 11. The pair of reel hubs 13 housed within the cassette casing 10 rotatably engage a pair of reel shaft insertion apertures. The apertures in the lower section 12 are positioned so as to establish a suitable spacing between the reel hubs 13. A magnetic tape 14 is wound around the reel hubs 13. Upper and lower bearings sheets 29 and 30 are interposed between the reel hubs 13 and the upper and lower sections 11 and 12 respectively.

The transparent window 11b and the upper and lower bearing sheets 29 and 30 constitute a remaining tape length indicator which allows visual observation of remaining tape length by the user.

A tape-protecting pivotal lid 17 is rotatably or pivotally attached to the right and left side walls of the cassette casing near the front edge of the tape cassette. When the tape-protecting lid 17 is pivoted away from the front surface of the tape cassette, the magnetic tape 14 is exposed. An essentially rectangular cut-out is formed in the front end of the lower section 12. When the magnetic tape casssette is inserted into a PCM recorder which will be briefly discussed later, a tape guide system or a device constituting part of a tape retaining mechanism (not shown), which pulls out some of the tape 14 for loading onto a rotary head of the PCM recorder, is inserted into the cut-out portion. A sliding closure member 24 engages the lower section 12 and covers and exposes the cut-out portion as it slides back and forth.

While the tape cassette is not in use, the tape-protecting lid 17 lies opposite the front opening in the front surface of the casing 10 to cover the latter. At the same time, the sliding closure 24 is in its forwardly-shifted position in which it covers the cut-out portion of the lower section 12 and thus prevents the tape guide system from reaching into the tape cassette for the tape. The tape-protecting lid 17 can pivot away from the front surface of the cassette to expose the magnetic tape 14, and the sliding closure member 24 can move to the rear to expose the cut-out portion so that the tape guide system can reach into the cut-out portion to draw some of the magnetic tape 14 out of the cassette casing for loading onto a rotary drum for recording or playback. Thereafter, when the recording or playback is over and the tape cassette is returned to the stand-by state, the tape-protecting lid 17 and the sliding closure member 24 are returned to the aforementioned closed positions. Throughout the rest of this document, the positions of the tape-protecting lid 17 and the sliding closure member 24 in which they cover the front opening and the cut-out portion respectively will be referred to as a "stand-by position" and the position of the lid 17 and the closure member 24 in which they expose the front opening and the cut-out portion will be referred to as a "use position".

The cassette casing 10 also has a pair of integral tape guide columns 15 on the left and right sides of the front edge of the lower section 12, as shown in FIG. 3. The magnetic tape 14 is stretched between and around the tape guide columns 15 so as to follow a predetermined tape run or path along the front edge of the tape cassette and across the front opening over the rotary head.

The essentially rectangular cut-out portion of the lower section 12 extends over a predetermined width so as to expose the rear surface of the magnetic tape 14 stretched between the tape guide columns 15. During recording or reproduction, a device constituting part of the tape handling system or the tape guide system projects into the cut-out portion and draws out a section of the magnetic tape 14. The tape handling system is part of the PCM recorder.

The tape-protecting lid 17 is elongated along the major dimension of the front opening and has side plates 31 serving as pivot arms and projecting from its opposite ends which pivotably attach the tape-protecting lid 17 to the front of the cassette casing 10 by means of pivot shafts 18. Thus, the tape-protecting lid 17 can be pivoted to selectively cover and expose the front opening of the cassette casing 10. The tape-protecting lid 17 also comprises a plate 17a which is elongated in the direction of the opening in the cassette casing 10 and covers the entire length of the front of the cassette casing 10. When the tape-protecting lid 17 is rotated to the closed position to cover the front of the cassette casing 10, the side plates 31 lie flush with the contours of the upper section 11 as best shown in FIG. 1. When the tape-protecting lid 17 is in this position, the closure member 24 is held in its forward position under the side plate 31 as shown in FIG. 1 by means described later. The pivot shafts 18 about which the tape-protecting lid 17 pivots are approximately centered on the inner surfaces of the respective side plates 31.

The sliding closure member 24 has a flattened U-shaped configuration and is so mounted on the lower section 12 of the cassette casing 10 that it can slide back and forth parallel to the lower surface of the lower cassette section 12. Apertures respectively corresponding to the reel shaft insertion apertures of the lower section 12 are formed in the sliding closure member 24 in such positions that after the sliding closure member 24 slides all the way backwards to expose the cut-out portion, the apertures are respectively aligned with the reel shaft insertion apertures.

The sliding closure member 24, as shown in FIG. 3 comprises a flat plate 24a which lies parallel to the lower surface of the lower section 12 and side plates 24b along the left and right sides of the flat plate 24c while lie parallel to the outer surfaces of the left and right side walls of the lower section 12. Flanges 25 are formed by bending the upper edges of the side plates 24b inwards. The flanges 25 engage guide recesses 26 in the side wall of the lower sections 12. After assembly, a spring anchor 27 on the flat plate 24a projects through a spring-accommodating slot in the shielding plate 16 of the lower section 12. The spring anchor 27 anchors one end of a tension coil spring 28 designed to bias the closure member 24 forward. The other end of the tension coil spring 28 engages a spring- engaging column disposed near the cut-out of the lower section 12, with the result that the closure member 24 is biased forward toward its stand-by position.

FIG. 2 shows the relative position of the tape-protecting lid 17, the sliding closure member 24, a reel brake member 20, which is described below, the upper section 11 and the lower section 12. Each of these components may be made of synthetic resin, such as ABS resin. The lower section 12 comprises an essentially rectangular flat plate in which the reel shaft insertion apertures are formed and a frame including left and right side walls, a front portion in which the tape guide columns 15 are formed, and a rear wall. Most of the side walls and the outer surface of the flat plate of the lower section 12 are recessed so that the sliding closure member 24 lies flush with the outer surface of the remainder of the side walls and floor of the lower section 12.

As shown in FIG. 3, the tops of the side walls of the lower section 12 have indentations 19. When the o upper section 11 and lower section 12 are assembled together, the indentations 19 oppose indentations in the side walls of the upper section 11. The indentations then form apertures allowing pivotal mounting of the rotary shafts 18 of the tape-protecting lid 17. Rectangular insertion apertures 12a are formed near the front, lower corners of the support walls 12. Shields 15 and 16 define the three walls of the cut-out portion, whereby the inside of the cassette casing 10 is shielded from the cut-out portion.

The reel brake member 20 comprises a slide guide plate 20a which is elongated in a direction parallel to the front opening of the casing and to the lid 17 and lies along the inner surface of the upper section 11. The member 11 also comprises generally L-shaped arms 23 which respectively extend perpendicularly downward from either end of the slide guide plate 20a and then forward. Brake pins 22 extend rearward from the slide guide plate 20a and oppose the respectively corresponding reel hubs 13, each of which is formed with a plurality of braking notches or braking teeth 13a engagable with the corresponding brake pin 22.

The braking notches or teeth 13a form brake wheels along the outer peripheries of the reel hubs 13.

A spring-retaining stud 20b is provided at the center of the slide guide plate 20a, and operating tabs 33 are formed on the extreme ends of the arms 23.

When the magnetic tape constructed as above is loaded into a cassette tape player serving as a recording and reproducing apparatus, the tape-protective lid 17 is moved to its opened position by means of an actuator pin provided in the tape player. The reel brake 20 is actuated by the tape-protective lid 17 to its brake-release position so as to allow the reel hubs 13 to rotate. At the same time, the sliding closure member 24 is shifted to its shifted position to open the o front end cut-out of the tape cassette so as to allow access to the tape. These operations readying the tape cassette for recording and reproducing have been disclosed in co-pending U.S. patent applications Ser. Nos. 704,943 and 711,521, respectively filed on Feb. 25, 1985 and Mar. 14, 1985, and assigned to the common assignee. British Patent Application No. 85 05757, filed on Mar. 6, 1985 corresponds to the aforementioned U.S. patent application Ser. No. 704,943, and European Patent Application No. 85 103 612.9, filed on Mar. 26, 1985 correspond to the aforementioned U.S. patent application Ser. No. 711,521. The contents of the above-identified co-pending applications are hereby incorporated by reference for the sake of disclosure.

Inserting the tape cassette in the tape player prepares the magnetic tape 14 to be driven for recording and reproducing. Since the specific embodiment is directed to tape cassettes specifically designed for one-way drive, the magnetic tape is always driven forward in a play or a fast-forward mode to feed the magnetic tape from one reel hub onto the other reel hub and driven backward in a reverse mode to feed the tape from the second reel hub onto the first reel hub. During playback, the user can easily see how much tape is left for recording and/or reproduction through the remaining tape length indicator. In order to display the remaining tape, the preferred embodiment of the remaining tape length indicator comprises the transparent window 11b in the upper section 11 of the cassette casing and upper and lower bearing sheets 29 and 30.

Figure 4:
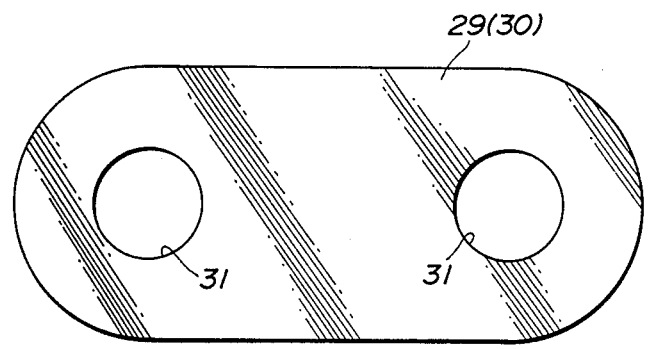
FIG. 4 is a plan view of a bearing sheet of the tape cassette of FIG. 1 constituting a major part of the preferred embodiment of the magnetic tape cassette of the invention.
Figure 5:
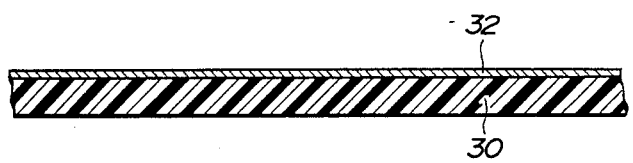
FIG. 5 is an enlarged partial section through the bearing sheet of FIG. 4.
Figure 6:
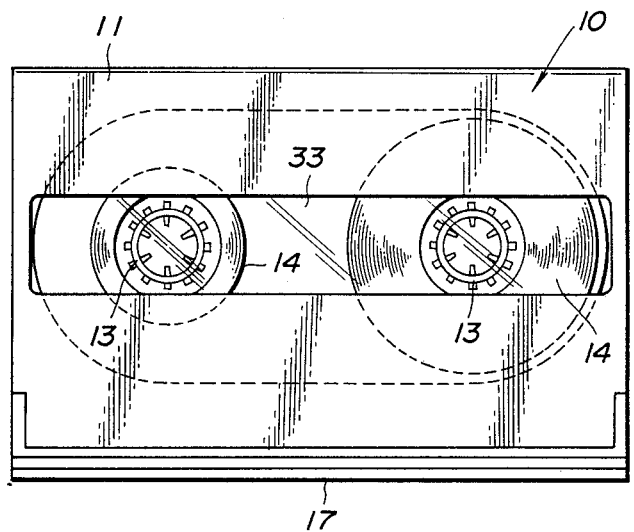
FIG. 6 is a plan view of the magnetic tape cassette showing the preferred embodiment of the remaining tape length indicator.

As shown in FIGS. 4 and 5, both of the upper and lower bearing sheets 29 and 30 are made of a thin synthetic resin film, e.g. a high-polymer sheet, formed into rectangles capped at two ends with semicircles, similar to the shape of a running track. Each of the bearing sheets 29 and 30 has a pair of circular openings 31 at positions corresponding to the reel hubs 13 so that one end of the reel hubs 13 extends therethrough. As shown in FIG. 5, the resin film used in the bearing sheets 29 and 30 has two layers, a high-polymer sheet 32a and a lubricating layer 32b. The lubricating layer 32b lies on the side facing the edge of the magnetic tape 14. This lubricating layer allows sufficiently smooth sliding of the tape across the bearing sheet and thereby assures smooth driving of the tape.

The upper bearing sheet 29 is transparent so as to show the magnetic tape on the reel hubs 13. On the other hand, the lower bearing sheet 30 is pigmented and opaque. The color of the lower bearing sheet 30 is chosen to provide good color contrast with the color of the magnetic tape 14. In the preferred embodiment, the lower bearing sheet 30 is colored white so as to ensure good color contrast with brown or black tape 14.

The colored lower bearing sheet 30 allows the tape 14 to be seen clearly through the transparent upper bearing sheet 29 and the transparent window 11b. Therefore, observation of the remaining tape length through the transparent window 11b is facilitated.

Therefore, the present invention fulfills all of the objects and advantages sought therefor.

While the specific embodiments have been disclosed in order to facilitate full understanding of the invention, the invention can be modified or embodied in various ways without departing from the principle of the invention which is set out in the appended claims.

What is claimed is:

1. A magnetic tape cassette comprising:
   a cassette casing housing a pair of tape reels onto which magnetic tape is wound;
   a transparent window formed in one surface of said cassette casing so as to show the interior of said cassette casing;
   a transparent bearing sheet disposed within said cassette casing between said tape reels and an inner surface of said transparent window; and
   an opaque bearing sheet disposed between an opposite surface of said cassette casing and said tape reels, said opaque bearing sheet being so colored as to provide good color contrast with the color of said magnetic tape.

2. A single-sided magnetic tape cassette comprising:
   a cassette casing housing a first tape reel onto which a magnetic tape is wound and which is driven in a first direction during recording and reproduction, and a second tape reel onto which said magnetic tape is wound and which is driven in a second, opposite direction during rewinding of said magnetic tape;
   a transparent window formed in one surface of said casssette casing so as to show the interior of said cassette casing;
   a transparent bearing sheet disposed between said first and second tape reels and said transparent window; and
   an opaque bearing sheet disposed between a surface of said cassette casing and said tape reels, said opaque bearing sheet being so colored as to provide good color contrast with the color of said magnetic tape.

3. A magnetic tape cassette comprising:
   a cassette casing housing a tape reel onto which a magnetic tape is wound;
   a movable tape-protecting lid for selectably covering and exposing a front mouth of said casing, said tape-protecting lid having a side plate extending substantially parallel to side walls of said casing and pivoted thereon;
   a reel brake disposed within said casing and movable between a reel-brake state and a brake-release state, said reel brake being biased toward said reel brake state, in which it restricts rotation of said tape reels; and
   a remaining tape length indicator having:
      a transparent window formed in one surface of said casssette casing so as to show the interior of said cassette casing;
      a transparent bearing sheet disposed between said tape reels and said transparent window; and
      an opaque bearing sheet disposed between an opposite surface of said cassette casing and said tape reels, said opaque bearing sheet being so colored as to provide good color contrast with the color of said magnetic tape.

4. A single-sided magnetic tape cassette comprising:
   a cassette casing housing a first tape reel onto which a magnetic tape is wound and which is driven in a first direction during recording and reproducing, and a second tape reel onto which said magnetic tape is wound and which is driven in a second, opposite direction during rewinding of said magnetic tape, said cassette casing haven a front mouth allowing access to said tape;
   a movable tape-protecting lid for selectably covering and exposing part of the front mouth of said casing, said tape-protecting lid having a side plate extending substantially parallel to side walls of said casing and pivoted thereon;
   a sliding closure member for selectively covering and exposing the remainder of said front mouth, said sliding closure member being slidable along one surface of and outside of said cassette casing;
   a reel brake disposed within said casing and movable between a reel-brake state and a brake-release state, said reel brake being biased toward said reel brake state, in which it restricts rotation of said tape reels; and
   a remaining tape length indicator having:
      a transparent window formed in the opposite surface of said casssette casing so as to show the interior of said cassette casing;
      a transparent bearing sheet disposed within said cassette casing between said tape reels and said transparent window; and
      an opaque bearing sheet disposed between the first surface of said cassette casing and said tape reels within said cassette casing, said opaque bearing sheet being so colored as to provide good color contrast with said magnetic tape.

* * * * *